United States Patent [19]
Livshits et al.

[11] Patent Number: 5,463,993
[45] Date of Patent: Nov. 7, 1995

[54] ENGINE SPEED CONTROL

[75] Inventors: Mikhail Livshits, Southfield; David J. Sanvido, Novi; Charles H. Folkerts, Troy, all of Mich.

[73] Assignee: General Motors Corporation, Detroit, Mich.

[21] Appl. No.: 202,962

[22] Filed: Feb. 28, 1994

[51] Int. Cl.⁶ .............................. F02D 41/16; F02D 43/00
[52] U.S. Cl. .................... 123/339.2; 123/339.11; 123/352
[58] Field of Search ..................... 123/339, 340, 123/341, 352, 360, 361

[56] References Cited

U.S. PATENT DOCUMENTS

| | | | |
|---|---|---|---|
| 4,237,838 | 12/1980 | Kinugawa et al. | 123/327 |
| 4,625,281 | 11/1986 | Deutsch | 123/339 |
| 4,658,783 | 4/1987 | Janetzke et al. | 123/339 |
| 4,660,519 | 4/1987 | Stocker et al. | 123/339 |
| 4,709,674 | 12/1987 | Bianchi et al. | 123/339 |
| 4,957,083 | 9/1990 | Nakaniwa et al. | 123/436 |
| 5,094,213 | 3/1992 | Dudek et al. | 123/478 |
| 5,121,726 | 6/1992 | Di Nunzio et al. | 123/339 |
| 5,133,319 | 7/1992 | Ikeda et al. | 123/339 |

*Primary Examiner*—Andrew M. Dolinar
*Attorney, Agent, or Firm*—Michael J. Bridges

[57] ABSTRACT

Internal combustion engine speed is controlled through a nested plurality of compensation loops each of which is dedicated to exclusively addressing engine control processes and the delays associated therewith. State observers provide predicted state values to the plurality for generation of desired state values at a subsequent cylinder event. Feedforward compensation is included to compensate for substantially constant engine loads of known magnitude while such loads are determined to be applied. Ignition timing advance compensation is favored for small speed errors or when rapid response is required, and engine inlet air rate compensation is favored for large speed errors or when slower response can be tolerated.

11 Claims, 3 Drawing Sheets

ENGINE SPEED CONTROL

FIELD OF THE INVENTION

This invention relates to internal combustion engine speed control and, more specifically, to engine speed control including a plurality of compensation loops arranged in a nested configuration.

BACKGROUND OF THE INVENTION

Internal combustion engine speed control, for example engine idle speed control or cruise control in which engine speed is controlled through engine torque adjustment is generally known to present significant control accuracy and stability challenges. Control designers attempt to provide a system that rapidly rejects the wide variety of disturbances incident on the system that perturb engine load and tend to drive engine speed away from a target or desired engine speed.

To provide such disturbance rejection, situational feedforward control has been proposed in which many of the sources of engine load perturbation are analyzed and interpreted to estimate overall engine load. A significant effort is required to calibrate systems employing such complex feedforward control. Furthermore, the processing throughput required to monitor and analyze the many combinations of the sources of engine load perturbation to arrive at a single load estimate significantly burdens the engine controller.

As an alternative to, or in addition to such feedforward control, feedback control has been proposed in which a control parameter is sensed and fed back to a controller which attempts to compensate for deviations in the parameter value away from a desired value. Current control systems with fuel injected internal combustion engines have significant time delays caused by such processes as engine intake manifold filling, fuel delivery, combustion, and rotational dynamics. The delays caused by such processes decrease torque delivery response and thus introduce significant transient error into the engine speed control. A single feedback loop must typically compromise on the extent it compensates for such delays to remain stable and out of saturation. In other words, the ability of the controller to compensate for the significant time delays is limited by any single feedback loop in its structure, as that single loop must compensate for all of the delay effects. The necessary large gain requirements that are associated with any such single loop are unacceptable as they compromise control stability goals.

Accordingly, it would be desirable to provide for engine speed control while avoiding the rigorous calibration and burdensome throughput required with conventional situational feedforward approaches, and while avoiding the compensation limitations of single feedback loop structures.

SUMMARY OF THE INVENTION

The present invention delivers the desirable control features through a feedback-based engine speed control configuration that retains some benefits of situational feedforward control without the associated complexity and throughput burden, through a structure the compensation coverage of which is not significantly limited by stability constraints.

Specifically, a nested loop structure is provided, each loop of which compensates for propagation delays associated with different engine processes. For example, in a first inside loop, compensation is provided solely for the manifold filling process. In a next compensation loop, fuel delivery and combustion processes are compensated. Finally in an outer loop, rotational engine dynamics and system level effects are compensated. Separate control and calibration of each loop is provided and relatively simple transfer functions may be used for each loop. Each loop need only be concerned with the delays of the processes compensated by its loop, reducing control gain magnitude requirements and furthering overall system stability. The result is a more comprehensive coverage of the many sources of time delays in the engine control, without approaching stability limits and without saturating the control.

In a further aspect of this invention, an abbreviated form of situational feedforward compensation is added to the nested configuration to anticipate engine behavior for an improvement in control precision. In yet a further aspect of this invention, a hierarchy of control commands are available wherein commands are selected from the hierarchy for use in accord with the magnitude and desired responsiveness of the prescribed compensation.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
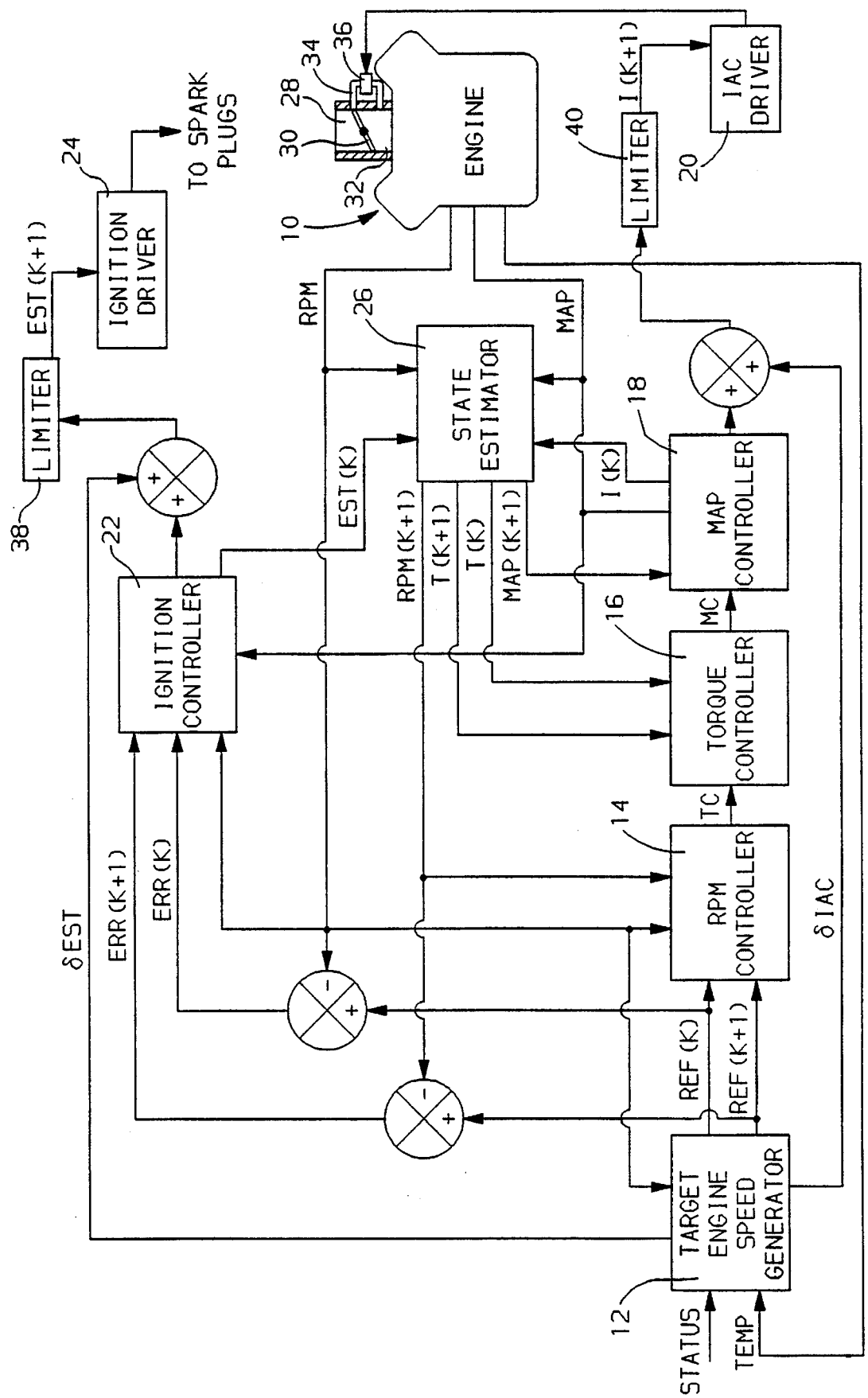
FIG. 1 is a diagram of the nested control structure describing the control structure provided in accord with the preferred embodiment of this invention.

Referring to FIG. 1, intake air is provided to internal combustion engine 10 via intake air path 28 in which is disposed an inlet air valve 30, which may be a conventional butterfly valve the degree of rotation of which restricts airflow from the intake air path 28 to an intake manifold 32. For airflow control at low engine speeds corresponding to relatively low intake airflow requirements that must be precisely controlled, such as at engine idle, the inlet air valve 30 may be substantially perpendicular to the direction of airflow through the intake air path 28 to severely restrict passage of air thereby.

At such low engine speeds in this embodiment, an appropriate intake airflow is provided by passing an intake air quantity through bypass conduit 34. The restrictiveness of bypass conduit 34 is controlled by positioning a conventional idle air valve 36, which may be a conventional binary solenoid valve, in the conduit. The position of the valve 36 responds to a varying command issued thereto from an idle air control IAC driver, such as a well-known device generating a fixed amplitude, fixed frequency, variable duty cycle command the on-time of which corresponds to an open valve position.

In an alternative embodiment in accord with this invention, the bypass conduit 34 and the idle air valve 36 may be eliminated, and precise control of engine inlet air may be provided through known electronic throttle control techniques, for example by directly controlling an actuator coupled to the inlet air valve 30 so as to precisely position the valve in the intake air path and thus provide a high resolution control of engine intake air, for example to meet the exacting requirements of engine idle air control. In such an alternative embodiment, the IAC driver 20 may be set up to drive the actuator coupled to the inlet air valve 30 to control the position thereof at all times while the engine 10 is operating.

Through the operation of the engine 10, an engine output shaft, such as a conventional crankshaft (not shown) rotates, the rotational speed of which may be designated as engine speed RPM, and may be measured by positioning a conventional rotational position sensor in proximity thereto. For example, a commercially available variable reluctance or Hall effect sensor may be positioned in proximity to the output shaft and may output a periodic analog signal the frequency of which is proportional to engine speed RPM. Each cycle of the analog engine speed signal may correspond to an engine net torque producing combustion event, called a cylinder event in this embodiment.

The rate of rotation of the engine output shaft is to be controlled in accord with this invention, so as to provide a desirable engine performance, for example at low engine speeds corresponding to engine idle. At engine idle, the engine speed is typically very sensitive to engine load disturbances, due to the relatively large ratio of disturbance torque to engine output torque. The engine speed control configuration of FIG. 1 is provided as a preferred example in accord with this invention, as a means of robustly controlling engine speed at engine idle speed ranges in which load disturbance sensitivity is generally understood to present significant control challenges.

Specifically in FIG. 1, the absolute air pressure MAP in intake manifold 32 is sensed by a conventional pressure transducer disposed in the engine intake manifold 32 and communicated as output signal MAP. Furthermore engine coolant temperature is sensed via a temperature sensor (not shown), such as a conventional thermocouple disposed in an engine coolant circulation path, and is communicated as output signal TEMP.

Signals RPM and TEMP are provided to a target engine speed generator 12 which generates, in accord with a predetermined schedule stored in a memory device, a target engine speed REF(K), such as a desired engine idle speed for the present control cycle indicated by index K, and for a next consecutive control cycle REF(K+1), indicated by index K+1. The target engine speeds may be constant speeds, determined in accord with an appropriate engine operating level for idle, such as approximately 700 r.p.m., or may vary in accord with a predetermined schedule, such as an engine warmup schedule, wherein the engine speed decreases with increasing engine coolant temperature TEMP.

The present target engine speed REF(K) and the predicted target engine speed REF(K+1) are communicated from the generator 12 to an RPM controller 14. In addition to the predicted engine speed information generated at the engine speed generator 12, feedforward terms are generated in accord with engine load status information provided to the generator 12. As is generally known in the art of engine speed control, the feedforward terms are estimates of the compensating engine speed change for the known engine load status. For example, if status information provided to the generator 12 indicates that vehicle air conditioning is operating such that the air conditioning compressor is to be included as an engine load, a calibrated compensating engine torque increase may be determined by the generator 12 in a manner generally known in the art and communicated as a desired increase in commanded engine inlet air δIAC or as an increase in engine spark advance δEST.

Other changes in known engine load may likewise be communicated to the generator 12 via the status information, so that engine idle air or spark advance may be adjusted in response thereto to maintain a stable engine idle speed, as is generally known in the art. The feedforward terms δIAC and δEST are communicated from the generator 12 for use in accord with this embodiment, as will be described.

The reference speed outputs of the speed generator 12 are provided to the RPM controller 14, as described, which is included in an outside control loop designed to compensate for rotational dynamic effects and for general disturbances incident on the engine speed control system of this embodiment. Certain system delays, such as delays associated with combustion, fuel delivery, and intake manifold filling, are not addressed in this loop but are rather assumed by this loop as fully compensated, as they will be addressed in lower level loops in accord with this invention. The control gains of this outside loop may then be decreased, improving the stability of the loop, as described.

Measured engine speed RPM and predicted engine speed RPM(k+1) are generated by state estimator 26, to be described, and are likewise provided to the RPM controller 14 which issues a compensating desired torque command TC to mitigate the error between the reference REF(k) and present engine speed RPM, and the error between the reference REF(k+1) and the predicted engine speed RPM(k+1). The compensating desired torque command TC may be generated through application of conventional control techniques, such as through conventional proportional-plus integral-plus-derivative control techniques applied to the error values, as are well-known in the art.

The compensating torque command TC is provided to a middle control loop nested within the described outside control loop. Torque controller 16 resides within this middle control loop which is designed to compensate for fuel delivery and combustion delays in the system. The stability of this middle control loop is improved as it is responsive to only a portion of the system time delays, such as those associated with fuel delivery and combustion as manifested in engine torque errors.

Generally, this middle control loop including the torque controller 16 responds to a difference between desired torque TC and predicted actual engine torque via a conventional control strategy, such as conventional proportional-plus-derivative control strategy, to derive a desired engine intake air pressure command MC designed to appropriately compensate the torque difference. Provided as inputs to torque controller 16 are an estimated torque T(k+1) for a next consecutive cylinder event, and an estimated or measured engine torque value T(k) for the present cylinder event. The estimated torque values are provided by state estimator 26, to be described.

The generated command MC is then provided to an inside control loop nested within the middle control loop (and thus within the outside control loop). This inside control loop includes a MAP controller 18 which receives the command MC and receives an estimated engine intake manifold absolute pressure value MAP(k+1) for the next cylinder event from the state estimator 26, to be described. This inside loop compensates for manifold filling time delays by calculating a desired engine inlet air rate for the next cylinder event in response to the error between the desired MAP value MC and the predicted MAP value to command a new engine inlet air rate. The new inlet air rate may be generated by passing the described MAP error term through a conventional compensation function, such as a conventional proportionalplus-derivative control, to arrive at an inlet air rate to properly drive the predicted MAP toward the desired MAP, as is generally known in the art. The control stability of this inside loop is improved over that of the prior art by limiting the reach of the compensation provided thereby to manifold pressure error, such that only manifold filling time delay effects are within its scope. Such is the case with the multiple nested control loops described in this embodiment in accord with this invention. Overall system stability is improved by delegating each of a nested hierarchy of control loops a portion of the entire process to be controlled. Each loop thereby has a manageable control task, which can be provided for with reduced control gains, improving system stability and avoiding control saturation.

The MAP controller 18 outputs a desired idle air command I(K) for the present cylinder event, designated by its index K to the state estimator 26, to be described, and outputs a desired idle air command I(K+1) for the next cylinder event designated by index K+1 to be summed with the described idle air command feedforward term $\delta$IAC from the target speed generator 12. The sum of these two commands is next limited via conventional limiter 40, so as to not exceed any hardware or bandwidth constraints, and then is passed the commanded idle air valve position, to be issued to the idle air valve 36 at an appropriate time via the described IAC driver 20. The time of issuance of this command I(K+1) should correspond to the time of the next (K+1) engine cylinder event, such as may be indicated by the described signal RPM.

Ignition controller 22 receives signals MAP, RPM, an error term, generated as the difference between present engine speed RPM and REF(K), designated as ERR(k), and a predicted error term, generated as the difference between predicted engine speed RPM(K+1) and REF(K+1), designated as ERR(K+1). In this embodiment, the ignition controller 22 is responsive to engine speed error to contribute to the compensation for rotational dynamic effects and all disturbances existing in the system. In other words, the compensation provided by ignition controller 22 of this embodiment addresses the processes addressed by the compensation of the outside control loop described above. The inventors have restricted the ignition controller-based compensation provided in this embodiment due to the limited authority of the ignition control of this embodiment and of typical engine speed control systems. The ignition control, which is charged with adjusting spark advance angle to trim engine torque, as is well-known in the art, is typically limited to approximately ten degrees of spark advance angle authority. As such, its degree of engine speed control authority is significantly limited. While ignition control in accord with this invention could be applied as compensation for any of the described processes compensated in this embodiment, it has been relegated to compensation for rotational dynamic effects and system level disturbances.

In an alternative embodiment within this invention, the ignition controller may be included in the nested compensation configuration used to generate the idle air control command issued to IAC driver 20. For example, the nested loop configuration of FIG. 1 may be used within the scope of this invention to generate both an idle air command and an electronic spark timing command, both of which contribute compensation for the described processes involved in engine speed control.

Returning to FIG. 1, the ignition controller 22 is provided the engine speed error information for generation of an appropriate spark advance angle adjustment to reduce the error in a controlled manner toward zero. For example, a conventional proportional-plus-derivative control strategy may be employed to act on and drive any engine speed error, whether for the present cylinder event or for the next cylinder event, toward zero. Added to any such compensating advance angle in this embodiment is a minimum spark advance for best torque MBT value, as may be referenced from a conventional non-volatile memory device as a predetermined function of such reference engine parameters as engine speed RPM and manifold absolute pressure MAP.

MBT is a generally-known spark advance for the current engine operating conditions to provide the maximum engine output torque without causing engine knock. MBT is referenced from memory and added to the compensating value to provide an advance value output from ignition controller 22 to be summed with the described feedforward term $\delta$EST from the target engine speed generator 12. The sum is limited via limiter 38, so that the command does not exceed any hardware or bandwidth constraints, and is then passed as spark advance command for the next cylinder event EST(K+1) to ignition driver 24, which may generate ignition commands for the active one(s) of the engine spark plugs (not shown) and deliver such commands at the engine operating angle dictated by the top dead center position of the next cylinder to have a combustion event advanced in accord with the command EST(k+1).

The compensation for the outside control loop of FIG. 1 is provided through control of both spark advance and engine intake air rate, as described. In this embodiment, the control gains applied in RPM controller 14 and those applied in ignition controller 22 are selected so that spark advance angle has authority to provide the compensation for small engine speed errors or when dynamically fast compensation is preferred. Alternatively, for larger engine speed errors, or when slower dynamic control is sufficient, compensation is provided through engine inlet air rate adjustment via RPM controller 14. In some regions, both forms of compensation are effective and are applied.

The state estimator 26 of FIG. 1 receives engine parameter information, and provides a prediction of engine states used in accord with this invention. Input information to the state estimator 26 includes engine speed RPM, manifold absolute pressure MAP, present idle air command I(K) from MAP controller 18, and present spark advance command EST(K) from ignition controller 22. From this information, engine speed is predicted for the next cylinder event RPM(K+1), engine torque is predicted for the next cylinder event T(K+1) and is estimated for the present cylinder event T(K), and manifold pressure is predicted for the next cylinder event MAP(K+1). Such prediction may be carried out using any conventional parameter prediction means. Preferably however, the engine speed and torque prediction techniques described in copending application Ser. No. 08/202,961, filed Feb. 28, 1994 now U.S. Pat. No. 5,421, 302, and assigned to the assignee of this invention, are to be applied as the portion of the state estimator 26 used to predict RPM(K+1), T(K+1), and T(K). Furthermore, the prediction approach described in the U.S. Pat. No. 5,094, 213, assigned to the assignee of this invention, is preferably applied as the portion of the state estimator 26 used to predict MAP(K+1).

Figure 2A:
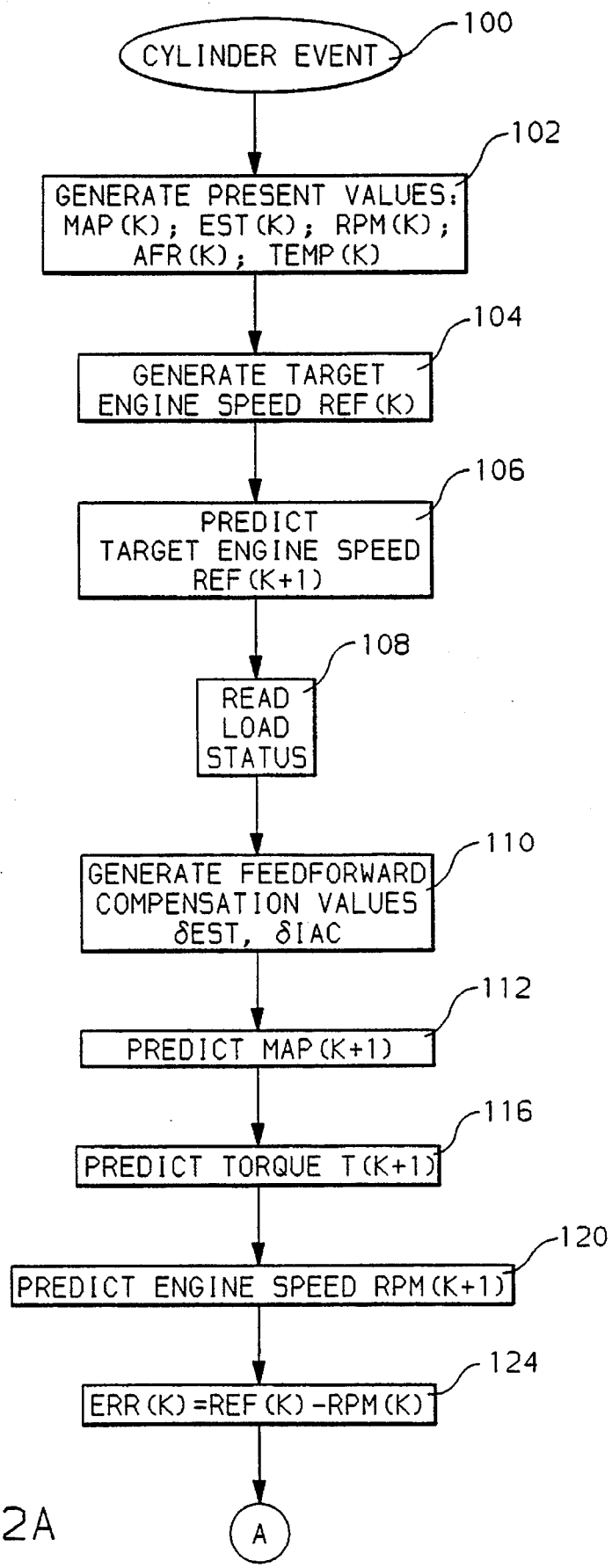
FIGS. 2a and 2b are control flow diagrams illustrating the steps used to carry out this invention in accord with the preferred embodiment.
Figure 2B:
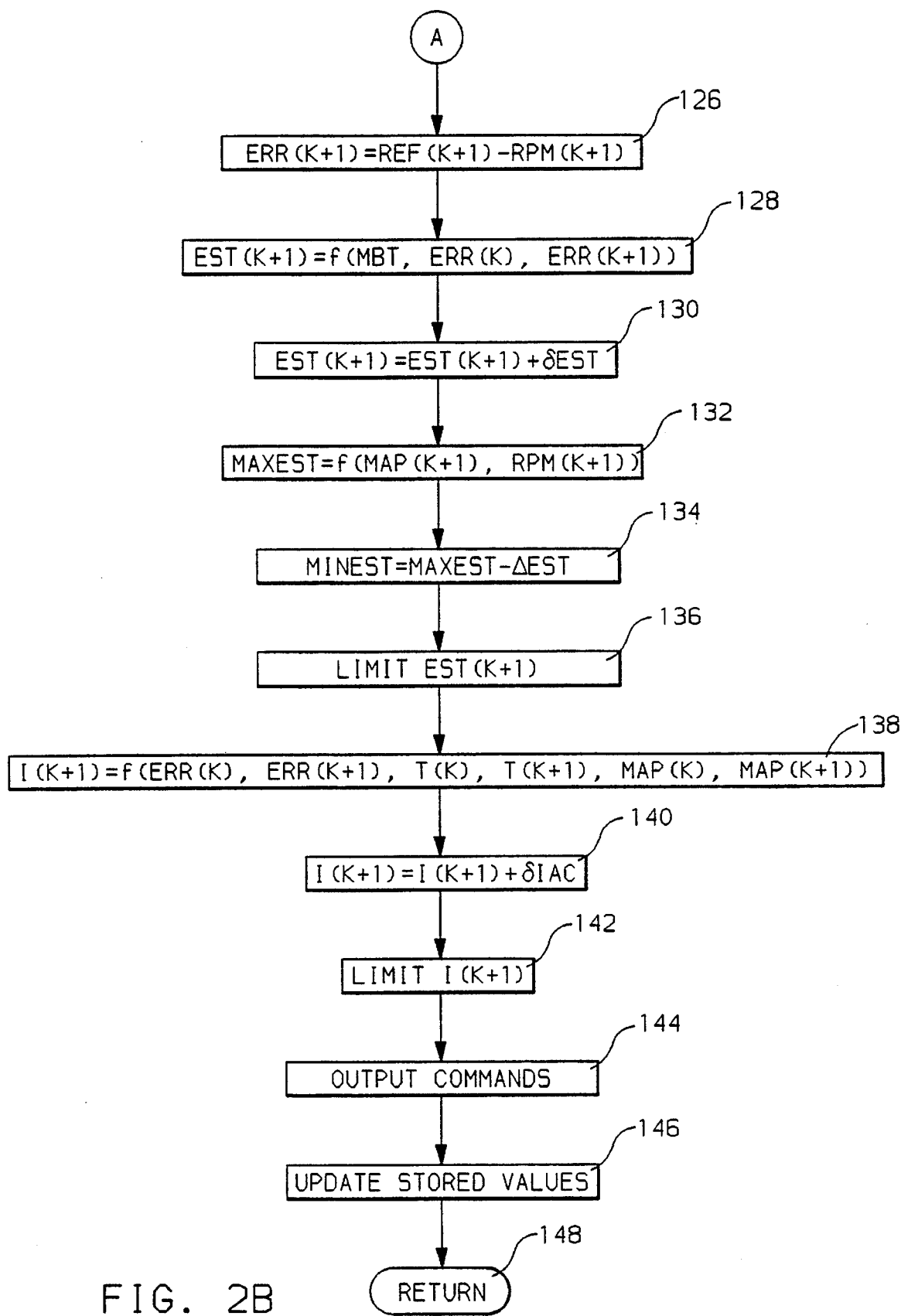

Turning to FIGS. 2a and 2b, a series of steps are illustrated that may be used to carry out the control process diagrammed in FIG. 1 in accord with the preferred embodiment hereof. The series of steps of FIGS. 2a and 2b may be stored as a series of instructions carried out by a conventional engine or powertrain controller, such as a conventional thirty-two bit, single chip microcontroller (not shown). An interrupt may be generated in the controller upon the occurrence of each cylinder event of the engine as indicated by the analog signal RPM. Upon occurrence of the interrupt, the controller may be configured to begin the routine of FIGS. 2a and 2b as a conventional interrupt service routine, starting at the step 100, and proceeding to a step 102, at which engine control parameters may be read and a set of parameter present values generated from the read values, including a present commanded spark advance EST(K), as provided by ignition controller 22 (FIG. 1), and a present engine air/fuel ratio AFR(K), as generated from an air/fuel ratio sensor (not shown), such as from a conventional zirconium-oxide sensor disposed in the engine exhaust gas path (not shown). Other generated values include present manifold absolute pressure MAP(K), present engine speed RPM(K), and present coolant temperature TEMP(K), all of which are derived from corresponding described measured engine parameters.

After generating the parameter values at the step 102, the routine moves to a step 104, to generate a target engine speed value REF(K) in the manner described in FIG. 1 as carried out by the target engine speed generator 12 from a predetermined stored schedule of target engine idle speeds. The routine then moves to a step 106 to predict a target engine speed REF(K+1) as the desired engine speed for the next (K+1) cylinder event. This prediction may be carried out as described for the operation of target engine speed generator 12 of FIG. 1.

The routine of FIGS. 2a and 2b then proceeds to a step 108 to read information on the status of known engine loads, such as from a word in controller memory comprised of status flags. Each status flag within the word may represent the status of a specific engine load. For example, a first flag may indicate whether vehicle air conditioning is off or on. A second flag may indicate whether a rear window defogger is off or on, etc. Included in the status word are those loads that are easily determined to be present or not present and that contribute a known, substantially constant change in engine load, so they may substantially compensated in a feedforward manner.

Returning to FIG. 2a, after reading the information on load status at the step 108, the routine moves to a step 110 to generate feedforward compensation terms in response to the known load information, as is generally known in the art. For example, to the extent that the load increase can be estimated for any load acting on the system, as indicated by the load status information read at the step 108, a compensating change in spark advance δESC or a compensating change in engine inlet air δIAC may be stored in memory and referenced at the step 110. The sum of all of such compensating changes for each of spark advance and engine inlet air are determined at the step 110 as the values δESC and δIAC, respectively.

After determining the compensating feedforward terms at the step 110, the routine moves to a step 112 to predict manifold absolute pressure MAP(K+1) at the next cylinder event, for example using the state prediction approach of U.S. Pat. No. 5,094,213, assigned to the assignee of this application, applied to manifold pressure prediction, as described. After generating the MAP(K+1) prediction, the routine moves to a step 116, to predict engine output torque for the next cylinder event. This prediction may be carried out through application of the prediction approach described in the U.S. patent application no. Ser. No. 08/202,961, filed Feb. 28, 1994, now U.S. Pat. No. 5,421,302 and assigned to the assignee of this application.

After predicting engine torque using the described technique of the copending application, the routine of FIG. 2a moves to a step 120, to predict engine speed RPM(K+1) at the next cylinder event. Such prediction is made in this embodiment through application of the prediction techniques detailed in the U.S. application Ser. No. 08/202,961, filed Feb. 28, 1994, now U.S. Pat. No. 5,421,302 and assigned to the assignee of this application.

Upon predicting engine speed RPM(K+1), the routine moves to a step 124, to generate engine speed error for the present cylinder event ERR(K) as the difference between the reference REF(K) and the generated engine speed RPM(K). The routine next proceeds to a step 126 to generate a predicted engine speed error for the next cylinder event ERR(K+1) as the difference between the predicted reference engine speed REF(K+1) for the next cylinder event and the predicted engine speed RPM(K+1) for the next cylinder event.

The routine then proceeds to a step 128, to generate a commanded spark advance angle for the next cylinder event EST(K+1) as a predetermined function of a referenced minimum best torque value MBT, and of the two error values. For example, this determination may be made as follows $$EST(K+1)=MBT+C1*ERR(K)+C2*ERR(K+1)$$

in which the coefficients C1 and C2 may be chosen in accord with conventional proportional-plus-derivative control techniques and furthermore may be weighted to increase the influence of spark advance in compensating for small engine speed errors over the influence of the engine inlet air based compensation, as described.

After generating EST(K+1) at the step 128, the routine moves to a step 130 to add the feedforward term δEST to EST(K+1), to compensate for known loads on the engine speed control system, as described. The routine then moves to a step 132 to generate a value MAXEST representing the maximum spark advance that will be tolerated in the present embodiment. For example, MAXEST may be generated as a predetermined function of RPM and MAP for the next cylinder event, as the spark advance limit beyond which the ignition system of the present embodiment and thus the engine 10 FIG. 1) cannot perform satisfactorily, especially in the performance categories of fuel economy and engine speed control stability. A typical MAXEST value is approximately forty degrees, which may vary slightly with engine speed RPM and manifold pressure MAP. MAXEST may be reference from a conventional lookup table in a memory device (not shown) from the reference parameters of RPM(K+1) and MAP(K+1).

The routine next, after referencing MAXEST at the step 132, advances to a step 134, to generate MINEST as a predetermined offset ΔEST below MAXEST, wherein ΔEST is predetermined as necessary to maintain MINEST at approximately zero degrees of spark advance, below which the ignition system and thus the engine 10 of this embodiment cannot function satisfactorily. For example, ΔEST may be set as a function of MAP(K+1) and RPM(K+1) in the manner described for MAXEST.

The generated spark advance limits are then used to limit EST(K+1) at a step 136, wherein EST(K+1) is set to the upper limit MAXEST if it exceeds that limit, and to the lower limit MINEST if it is less than that limit. This limiting of the spark advance, as provided for in the described steps 132–136 is intended by the inventors hereof to be in conformity with spark advance limiting procedures generally understood in the art of ignition and engine control.

The routine next moves to a step 138, to generate an idle air command for the next cylinder event I(K+1) as a predetermined function of the information generated through the nested loop configuration of this embodiment as follows $$I(k+1)=C3*ERR(K)+C4*ERR(K+1)+C5*[ERR(K)+C6*T(K+1)+C7*T(K)+C8*MAP(K)+C9*MAP(k+1)$$

in which constants C3–C9 are selected through a conventional calibration of the control system of this embodiment, for example in accord with the control goals of each of the nested loops described in FIG. 1. In this embodiment, the engine speed error compensation requires an appropriate selection of the constants C3–C5 for the compensation of the outside loop of FIG. 1, such as through a gain selection process for conventional proportional-plus-integral-plus-derivative control. Likewise, the gains C6 and C7 must be selected in accord with the described compensation for fuel delivery and combustion delays provided by the middle loop of FIG. 1, which relies on a proportional-plus-derivative control strategy in this embodiment. Finally, the gains C8 and C9 must be selected in accord with the described compensation for manifold filling delays in the inside loop of FIG. 1, wherein such gains will be applied in a conventional proportional-plus-derivative control strategy to the reduction of manifold filling error, as described.

Additionally, the gains should be adjusted to relegate some of the compensation for small engine speed errors or for situations in which a fast response is required to the spark advance compensation provided in this embodiment, and to increase the compensation burden carried by the engine inlet air controller of this embodiment for larger engine speed errors or for situations in which slower response is sufficient, as described.

After generating I(K+1) at the step 138, the routine moves to a step 140, to augment the idle air control command by the magnitude of the feedforward term δIAC, as generated at the described step 110, to compensate for known system load changes, as described. The routine then moves to a step 142, to limit I(K+1) to reasonable limits for the system of this embodiment, for example to avoid saturating the idle air control hardware, or to avoid operating close to system stability margins, as may be calibrated for the system to which the control of this embodiment is applied.

The routine then moves to a step 144, to output the commands to the appropriate drivers. For example, the spark advance command EST(K+1) is output to ignition driver 24 (FIG. 1), and the idle air command I(K+1) is output to the IAC driver 20 (FIG. 1). Such outputted commands will then be forwarded to appropriate spark plugs or to the idle air valve 36 (FIG. 1) based on the time of occurrence of the next engine cylinder event, as such commands are determined through the present invention in advance of the time they are to be issued, to improve the responsiveness and robustness of the engine speed control to which they are applied.

Returning to FIG. 2b, after issuing the commands to the appropriate actuators, the routine moves to a step 146, to update stored values for use in the next iteration of the present routine, which will occur on the next cylinder event interrupt. For example, values described in FIGS. 2a and 2b as having index K+1 will be updated at the step 146 to the index K, and then will be stored for use in the next iteration hereof. The routine then moves to a step 148, to return from the interrupt service routine of FIGS. 2a and 2b to resume any controller processes that were ongoing prior to the time of the interrupt that invoked the routine of FIGS. 2a and 2b. The controller will continue to carry out such processes, which may include conventional control, diagnostic and maintenance processes, until such time as the next cylinder event is detected, at which time an interrupt will be generated which will be serviced through the routine of FIGS. 2a and 2b.

The preferred embodiment for explaining this invention is not to be taken as limiting or restricting the invention as many modifications may be made through the exercise of skill in the art without departing from the scope of the invention.

The embodiments of the invention in which a property or privilege is claimed are described as follows:

1. An internal combustion engine speed control system having a plurality of compensation loops arranged in a nested loop configuration, each of the plurality being dedicated to exclusively compensating at least one corresponding engine process, comprising:

an outside compensation loop responsive to an engine speed error to generate a desired engine torque to mitigate the engine speed error and to compensate for delays associated with engine rotation dynamics, wherein the engine speed error includes a present engine speed error and a future engine speed error, wherein the present engine speed error is generated as a difference between a measured present engine speed and a predetermined desired present engine speed, and wherein the future engine speed error is generated as a difference between a predicted engine speed and a predetermined desired future engine speed;

desired pressure generating means for generating a desired engine intake manifold pressure in response to the desired engine torque; and an inside compensation loop nested within the outside compensation loop for generating at least one actuator command in response to a pressure difference between the desired engine intake manifold pressure and a predicted engine intake manifold pressure to mitigate the difference and to compensate for delays associated with engine intake manifold filling.

2. The control system of claim 1, wherein the predetermined desired present and future engine speeds correspond to engine idle speeds.

3. An internal combustion engine speed control system having a plurality of compensation loops arranged in a nested loop configuration, each of the plurality being dedicated to exclusively compensating at least one corresponding engine process, comprising:

an outside compensation loop responsive to an engine speed error to generate a desired engine torque to mitigate the engine speed error and to compensate for delays associated with engine rotation dynamics;

desired pressure generating means for generating a desired engine intake manifold pressure in response to the desired engine torque, comprising a nested compensation loop nested within the outside compensation loop and within which the inside compensation loop is nested, and wherein the desired engine intake manifold pressure is generated by the nested compensation loop in response to a torque error generated as a difference between the generated desired engine torque and a predicted engine torque to mitigate the torque error and to compensate for delays associated with engine torque production; and an inside compensation loop nested within the outside compensation loop for generating at least one actuator command in response to a pressure difference between the desired engine intake manifold pressure and a predicted engine intake manifold pressure to mitigate the difference and to compensate for delays associated with engine intake manifold filling.

4. The control system of claim 3, wherein the at least one actuator command includes an engine inlet air control command and an engine ignition timing advance command.

5. The control system of claim 4, further comprising:

means for determining a preferred control responsiveness in accord with the magnitude of the engine speed error, the magnitude of the torque error and the magnitude of the pressure difference;

means for increasing the authority of the engine ignition timing advance command and decreasing the authority of the engine inlet air command to control engine speed when engine speed error is within a predetermined low engine speed error range and when the preferred control responsiveness is within a predetermined rapid response range; and means for decreasing the authority of the engine ignition timing advance command and increasing the authority of the engine inlet air command to control engine speed when engine speed error is within a predetermined high engine speed error range and when the preferred control responsiveness is within a predetermined slow response range.

6. The control system of claim 3, further comprising a state estimator for generating the predicted engine intake manifold pressure and the predicted engine torque.

7. An engine speed control method for controlling engine speed in accord with a target engine speed, wherein each of a plurality of nested compensation loops exclusively compensates at least one corresponding engine process, comprising the steps of:

determining a present engine speed error as a difference between the target engine speed and the engine speed;

predicting engine torque, engine speed, and engine intake manifold pressure;

determining a predicted engine speed error as a difference between the target engine speed and the predicted engine speed;

generating, in an outside compensation loop, a desired engine torque in response to at least a predetermined one of the group including the engine speed error and the predicted engine speed error, to reduce engine speed error;

generating a desired engine intake manifold pressure corresponding to the desired engine torque;

generating, in an inside compensation loop nested within the outside compensation loop, at least one engine actuator command in response to a difference between the desired engine intake manifold pressure and the predicted engine intake manifold pressure to reduce the difference and to compensate for delays associated engine intake manifold filling; and controlling at least one actuator corresponding to the at least one generated actuator command, to provide for engine speed control.

8. The method of claim 7, wherein the step of generating a desired engine intake manifold pressure generates the pressure in a compensation loop nested within the outside compensation loop and within which the inside compensation loop is nested, in response to a torque error generated as a difference between the desired engine torque and the predicted engine torque, to reduce the torque error and to compensate for delays associated with engine torque production.

9. The method of claim 7, wherein the at least one actuator command includes an engine inlet air rate command and an engine ignition timing advance command.

10. The method of claim 7, further comprising the steps of:

sensing application of any of a predetermined set of substantially constant engine loads of known approximate magnitude;

referencing a corresponding predetermined feedforward compensation value for any of the set sensed to be applied; and adjusting the at least one actuator command as a predetermined function of the referenced values.

11. The method of claim 7, wherein the method is applied to control engine speed at engine idle and the target engine speed is a speed corresponding to engine idle.

* * * * *